US00RE38987E

(19) United States
(12) Reissued Patent
Mintz et al.

(10) Patent Number: US RE38,987 E
(45) **Date of Reissued Patent: *Feb. 28, 2006**

(54) METHOD AND APPARATUS FOR INSERTING AN INSERT INTO A COVER

(75) Inventors: David Mintz, Boca Raton, FL (US); Neil Mintz, Boca Raton, FL (US); Pierre Tremblay, Howell, MI (US)

(73) Assignee: Machine Design Systems, Inc., Boca Raton, FL (US)

( * ) Notice: This patent is subject to a terminal disclaimer.

(21) Appl. No.: 10/403,899

(22) Filed: Mar. 31, 2003

Related U.S. Patent Documents

Reissue of:
(64) Patent No.: 6,253,435
Issued: Jul. 3, 2001
Appl. No.: 09/110,537
Filed: Jul. 6, 1998

U.S. Applications:
(60) Division of application No. 08/628,399, filed on Apr. 5, 1996, now Pat. No. 5,774,965, which is a continuation of application No. 08/254,180, filed on Jun. 6, 1994, now abandoned, which is a continuation-in-part of application No. 08/025,106, filed on Mar. 2, 1993, now abandoned.

(51) Int. Cl.
*B68G 7/08* (2006.01)

(52) U.S. Cl. ..... 29/91.5
(58) Field of Classification Search ..... 29/91, 29/91.1, 91.5, 235, 713, 714, 717; 53/258, 53/524, 574, 575
See application file for complete search history.

(56) References Cited

U.S. PATENT DOCUMENTS 3,363,396 A * 1/1968 Lockrow et al. ..... 53/529
4,385,427 A * 5/1983 Fraiser ..... 29/91.5
4,675,962 A * 6/1987 Tillner et al. ..... 29/91.1
4,845,925 A * 7/1989 Thompson ..... 53/529
4,986,055 A * 1/1991 Mintz et al. ..... 29/91.1
5,048,265 A * 9/1991 Mintz et al. ..... 53/530
5,180,460 A * 1/1993 Coon et al. ..... 29/91.5
5,199,144 A * 4/1993 Abe et al. ..... 29/235
5,398,482 A * 3/1995 Hessell, Jr. et al. ..... 29/91.5
5,586,377 A * 12/1996 Katsuta et al. ..... 29/91.5
5,774,965 A * 7/1998 Mintz et al. ..... 29/91.5
6,199,251 B1 * 3/2001 Zeiler ..... 29/91.5
6,253,435 B1 * 7/2001 Mintz et al. ..... 29/91.5

* cited by examiner

*Primary Examiner*—David P. Bryant
(74) *Attorney, Agent, or Firm*—Gifford, Krass, Groh, Sprinkle, Anderson & Citkowski, P.C.

(57) ABSTRACT

A method and apparatus for inserting a supporting insert, such as a set insert (bun) for a vehicle, into a cover, such as a seat cover for a vehicle. The apparatus of the present invention includes a bench upon which a cover holding assembly and a stuffing bracket are provided. The holding assembly comprises four self-adjusting blades which are substantially grouped together at the beginning of the fitting cycle. After an inside-out seat cover's open end is fitted onto the blades, the blades move away from each other into the corners of the cover to expand the cover to its maximum size. The insert is then positioned between the top (closed) end of the covering material and the stuffing bracket. The stuffing bracket then drives the seat insert into the inside-out covering material, gradually turning the material outside-out as the insert is moved forward.

21 Claims, 7 Drawing Sheets

38
42
68
58
56
A
6
6
58
B
26
28
18
40
12

METHOD AND APPARATUS FOR INSERTING AN INSERT INTO A COVER

Matter enclosed in heavy brackets [ ] appears in the original patent but forms no part of this reissue specification; matter printed in italics indicates the additions made by reissue.

CROSS-REFERENCE TO RELATED APPLICATION

This patent application is a divisional of patent application Ser. No. 08/628,399 filed Apr. 5, 1996 [and which will issue as], *now* U.S. Pat. No. 5,774,965 [on Jul. 7, 1998], *which is a continuation of Ser. No. 08/254,180, Jun. 6, 1994, abandoned, which is a continuation-in-part of Ser. No. 08/025,106, Mar. 2, 1993, abandoned.*

I. FIELD OF THE INVENTION

The present invention relates generally to a method and apparatus for inserting an insert into a cover. More particularly, the present invention relates to the stuffing of a cover, such as a vehicle seat cover, with an insert, such as a vehicle seat bun. The vehicle may be a car, a truck, a boat, or a plane. Other possible applications of the present invention are for use with home or office furniture. The apparatus comprises a bench having a material holding assembly and a movable stuffing bracket. The holding assembly comprises four self-adjusting blades that move to expand within the covering material prior to insertion of the bun.

II. DESCRIPTION OF THE RELEVANT ART

Construction and installation of interior components of vehicles is one of the more difficult and awkward stages of vehicle assembly. Interior fittings and accessories such as arm rests, head rests, visors, compartment covers as well as vehicle seat backs and bases are composed of an insert or "bun" and a cover. The cover is typically assembled to form essentially an open-bottomed box having a base, two end pieces, a front piece, and a back piece. One end of each end piece is stitched to one end of the front piece, while the other end of each end piece is stitched to one end of the back piece. Each of the end, front and back pieces is stitched to the base thereby forming the open-bottomed box.

Methods of attaching the cover to the insert vary. In some instances, such as for assembly of seat backs, arm or head rests, the open end of the cover includes a material that is often elastic, a zipper, hook-and-loop fasteners, staples, hog rings, or a tie string. For these assemblies, the insert is placed into the cover and the open end is closed by retraction of the elastic material, zipping of the zipper, fastening of the hook-and-loop fasteners, or tying of the string. These methods of assembly comprise conventional assembly techniques.

In other assemblies, such as for seat bases, the open end of the cover is commonly fitted with a welting. The bottom of the seat base spring includes a peripheral channel. To assemble the seat base cover and seat base spring, the worker first rests the seat base spring on a support. The spring is either fixed in relation to the support, or is allowed to pivot on the support, thus allowing the worker to go from point to point during assembly without changing his position. The worker then places one comer of the cover over one comer of the spring, and, by pulling, places another corner of the cover over another comer of the spring and so on until all of the comers of the cover are over all of the comers of the spring. The worker then compresses the seat base spring so as to bring the top of the seat base spring closer to the bottom of the seat base spring, and, while working his way around the seat base, inserts the welt into the channel. A pair of pliers or a similar crimping tool is then used to crimp the channel, thereby locking the welt therein. The entire channel is not crimped at one time, but the worker instead "walks around" the base, crimping little by little as he goes, until the channel is completely crimped. The seat is then ready for use as a piece of furniture or, if used in a vehicle, for installation into the vehicle or for attachment to other seat parts.

As may be understood from this operation, most of the work of the actual installation of the seat cover is done by hand. The same is true for assembly of the other components. The most difficult part of the assembly maneuver is the fitting of the insert within the cover and fastening the cover to the insert. In any known method of assembly of any interior component, this step requires considerable pulling, stretching, and adjusting to be accomplished properly. However, the results are not always desirable. The product is often crooked, unevenly stretched, or torn. At best, the resultant seats assembled according to this procedure are of inconsistent quality. In addition to a comprised product, the worker himself often acquires bruised knuckles, scratched hands, and wrist disorders caused by repetitive movement, all signs of his trade.

While improvements related to these components exist, these relate generally to the insert or the cover, and not to the method of assembly. For example, covering materials with improved elastic qualities have appeared because of developments in polymer technology. Improvements also involve the use of different, more resilient foamed plastics for use as inserts, such as seat "buns".

But even with such improvements, the lot of the worker is little improved. Much of the stuffing, stretching, fitting, and fastening is done by hand, and the resulting bruised knuckles, scratched hands, and bandaged wrists still characterize the vehicle seat fitter. Beyond problems of human discomfort, known matches for fitting inserts into covers are not adjustable. Each machine is customized for use with a particularly styled seat or part. This lack of adjustability has severely limited the possible seat varieties and requires the manufacturer to have a different machine for each style of seat.

Accordingly, prior inventions have failed to overcome the problems that have long been associated with the fitting of a supporting insert, such as a seat base spring assembly, into a cover, such as a seat cover.

SUMMARY OF THE PRESENT INVENTION

The present invention overcomes the problems commonly associated with conventional methods and machines for stuffing vehicle seats and interior accessories. The present invention discloses a method and apparatus for conveniently and efficiently inserting an insert, such as a seat bun for a vehicle, into a cover, such as a seat cover for a vehicle. The present invention may be used with a variety of insert-cover combinations. For example, and with specific reference to automobiles seats and other parts, the invention may be used to fit a cover over an insert comprising a conventional foam pad or bun provided over a frame. Alternatively, the invention may be used to fit a cover-bun combination over the frame. The cover-bun combination is a product of "foam-in-place" technology (for example, polyurethane integral skin foams) wherein the foam pad or bun is formed on or bonded to the inside of a cover that is turned inside-out.

The apparatus of the present invention includes a bench upon which a covering material holding assembly and a stuffing bracket are operatively provided. Further provided on the bench is a control board. The control board is either manually operated or computer programmed.

The holding assembly comprises four blades that are selectively movable from a first, centrally-grouped "rest" position to a second, expanded-from-center position. The first position is used for fitting the open end of a covering material thereon. The second position is used for expanding the cover by the blades that each seek out a respective corner of the cover. The blades are fitted with sensors that automatically expand the blade to their maximum positions according to the interior dimensions of the cover, but do not allow the blade to expand further, thus preventing tearing without the need for continuous adjustment by the operator.

The blades are composed from a low friction material so that the covering material may more readily slide thereover. The material may be plastic, preferably polyethylene, or a metal, such as aluminium. The selected material has great tensile strength and also has a smooth and glossy finish that allows the covering material to easily slide along the blade surface without meaning the covering material. The holding assembly is pivotably mounted upon the bench so that it may be pivoted as a whole from an operator-accessible position where the blades face the worker to a cycling position where the blades face the stuffing bracket.

The stuffing bracket is movable in a back-and-forth direction for pushing the insert into the cover while the latter is held on the blades of the holding assembly. The bracket may also be adjusted up or down relative to the top surface of the bench to accommodate a variety of shapes and sizes of seats. The worker first places the top end of the insert in contact with the top end of the inside-out covering material and then places the bottom end of the insert in contact with the bracket. A cycle includes the stuffing bracket then moving the insert toward the holding assembly and between the blades. As the insert is pushed toward the holding assembly, the covering material, disposed between the blades and the insert, turns outside-out from top to bottom as the insert gradually is completely enveloped by the material.

The progress of the insert toward the holding assembly may be adjusted so that it is stopped at one or more discrete positions to allow the operator to manually attach the covering material to the insert with, for example, hog rings. The stopping positions are set prior to the commencement of the fitting cycle by pre-programming the computer-operated cycle or by moving manual control stop knobs to specific positions.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENTS OF THE PRESENT INVENTION

FIGS. 1 through 11 show the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figures 1, 2:
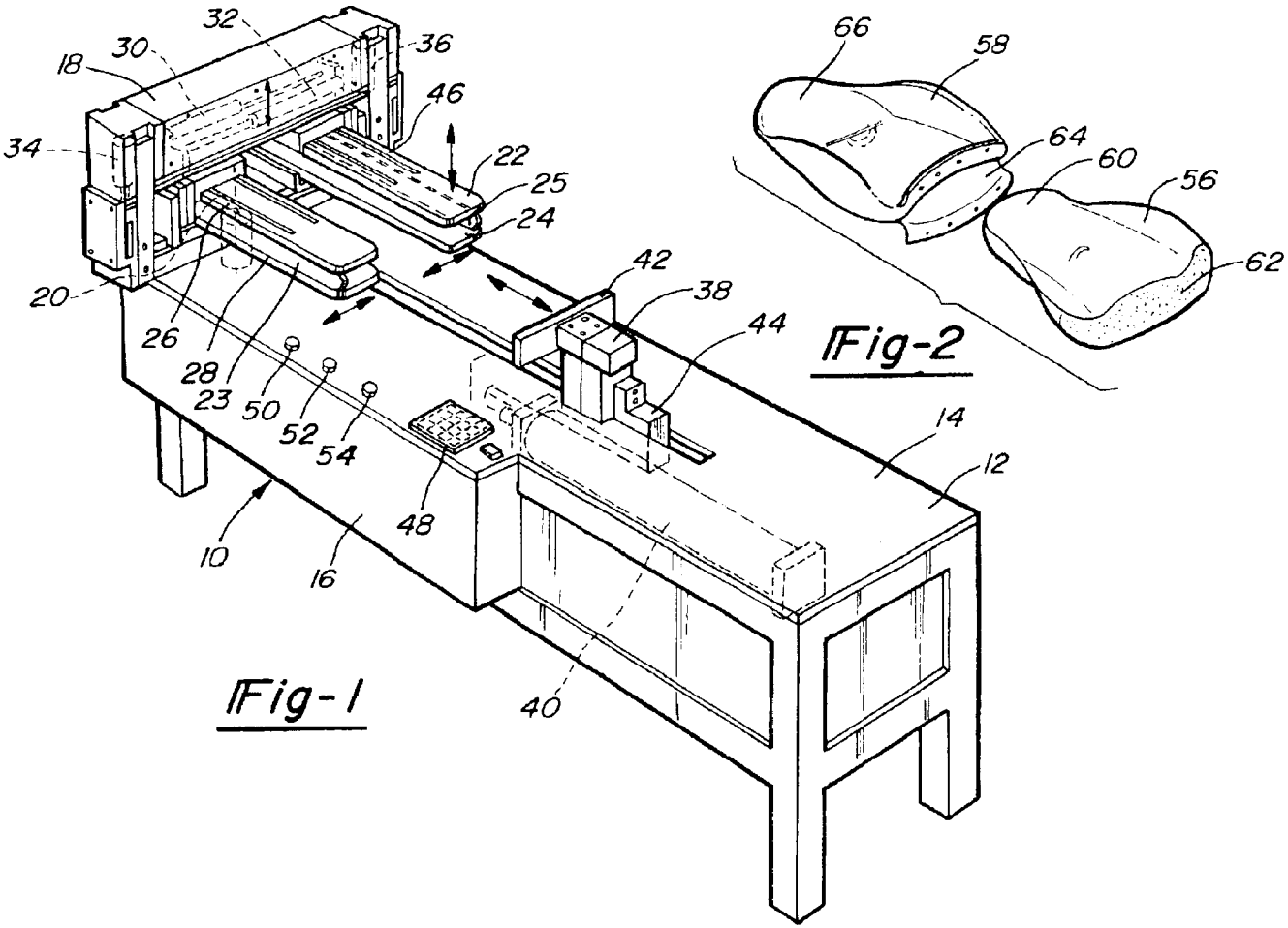
FIG. 1 is a perspective view of the preferred embodiment of the fitting apparatus of the present invention.
FIG. 2 is an exploded perspective view of an insert and an insert cover.

FIG. 1 is a perspective view of the preferred embodiment of the fitting apparatus of the present invention, generally indicated as 10. The apparatus 10 includes a bench 12 having an upper working surface 14 and a front 16.

A holding assembly 18 is illustrated on the working surface 14 at one end of the bench 12. The holding assembly 18 includes a body 19. Many components of the body are composed of extruded aluminum components. Preferably, the assembly 18 is pivotably mounted on the bench 12 by a pivoting arm 20. The pivoting arm 20 allows the operator to pivot the assembly from a cycling position, as illustrated, to an operator-accessible position (shown and discussed below in relation to FIG. 10). Without this feature, the operator would have a difficult time preparing the holding assembly 18 for its cycle or retrieving the assembled product, as will be discussed below in relation to FIG. 10.

At the heart of the holding assembly 18 is an array of horizontal blades 22, 24, 26, 28, and a pair of side blades 23, 25. As illustrated by the direction arrows, the blades 22, 24, 26, 28 are capable of moving in either direction along an x-axis and in either direction along a y-axis. The blades 23, 25 are capable of moving along the x-axis only. The blades 22, 24, 26, 28, 23, 25 are preferably composed of a low friction material. Such a material may be selected from certain plastics (for example, polyethylene), or from certain metals (for example, aluminum). The glossy surface of this material enables the covering material to move easily as it slips over the tips of the blades 22, 24, 26, 28, 23, 25 in response to the material-reversing movement of the insert.

Each of the blades 22, 24, 26, 28, 23, 25 is operated by a self-adjusting horizontal motion driver of which drivers 30, 32 are visible in conjunction with blades 22, 24. The motion drivers 30, 32 are for movement along the x-axis. Each of the blades 22, 24, 26, 28 is also operated by a self-adjusting vertical motion driver of which drivers 34, 36 are visible in conjunction with blades 22, 24. The motion drivers 34, 36 are for movement along the y-axis. The self-adjusting feature allows the blades 22, 24, 26, 28, 23, 25 to move into contact with the walls of the inside-out cover, but prohibits the blades to move so far as to stretch the material or to tear the stitching. This movement will be described more clearly with respect to the description accompanying FIGS. 6 and 7 set forth below.

Each of blades 22, 24, 26, 28 has defined therein a pair of parallel adjustment slots 46. The slots 46 are provided to maximize the adaptability of the apparatus 10 to be used in fitting a variety of inserts and covers by providing a method for adjusting the length of the blade. For example, when working very shallow covers, the operator would remove loosen fasteners (not shown) from the slots 46 provided near ends of the blade, slide the blades into the assembly 18, and tighten the fasteners in the slots 46. Any simple method of holding may be used. Stuffing of deeper covers requires the blades to be loosened, extended, then tightened.

The apparatus 10 includes a stuffing bracket 38. The stuffing bracket 38 pushes against the bottom end of an insert (shown in, for example, FIG. 4) so that the insert is driven into the inside-out covering material and between the blades 22, 24, 26, 28, and 23, 25. This will be discussed more fully below.

The movable components of the apparatus 10 may be driven by a variety of systems. For example, the system could be composed of pneumatic cylinders or electric motors or a combination of these units. Preferably, the system utilizes electronically-operated pneumatic drivers for maximum torque. More particularly, the stuffing bracket 38 is preferably driven by a pneumatic driver 40 (shown in broken lines). As mentioned briefly, an electric motor could substitute for the pneumatic driver 40, although the pneumatic system is preferred because of its reliability and because of the relatively large torque it is capable of producing. The stuffing bracket 38 includes an insert contacting plate 42 supported by a driving arm 44 interconnecting the plate 42 and the driver 30. The stuffing bracket 38 may include a manual adjustment to modify the stroke in addition to the automatic movement.

The apparatus 10 is preferably driven by pre-programmed system comprising a timer and programmer 48 to assure consistency of product and ease of operation. The operator punches into the programmer the number of stops (if any), the positions of the stops, and the amount of time for each stop delay. This is one of the advantages of having an electronically-operated system and allows for a virtually infinite number of stops for varying lengths of time. For example, the system may be programmed so that movement of the stuffing bracket 38 is halted at ten inches from its starting point for five seconds to allow attachment of a hog ring. Once set, the cycle may be repeated from operation to operation without the need of being rest. Three control buttons, a chute button 50, an abort button 52, and a start button 54 are provided to commence or cancel the operation. The chute button 50 engages the blades 22, 24, 26, 28 once the cover 58 is in place. Once the cover 58 is in position, the cycle may be started. By pressing the chute button 50 and the start button 54 simultaneously, the cycle begins. A single abort button 52 is provided to immediately interrupt the cycle.

FIG. 2 is an exploded perspective view of an insert 56 and a cover 58. The insert 56 illustrated here is a seat back, although other structures such as head and arm rest inserts may be substituted. The insert 56 includes a top end 60 and a bottom end 62. The cover 58 is contoured to substantially mate with the insert 56. The cover 58 includes an open bottom end 64 and a closed top end 66. The cover 58 is conventionally composed of leather or a vinyl or a similar polymer. The insert 56 conventionally comprises a metal frame (not visible) overlaid with a foam pad.

Figure 3:
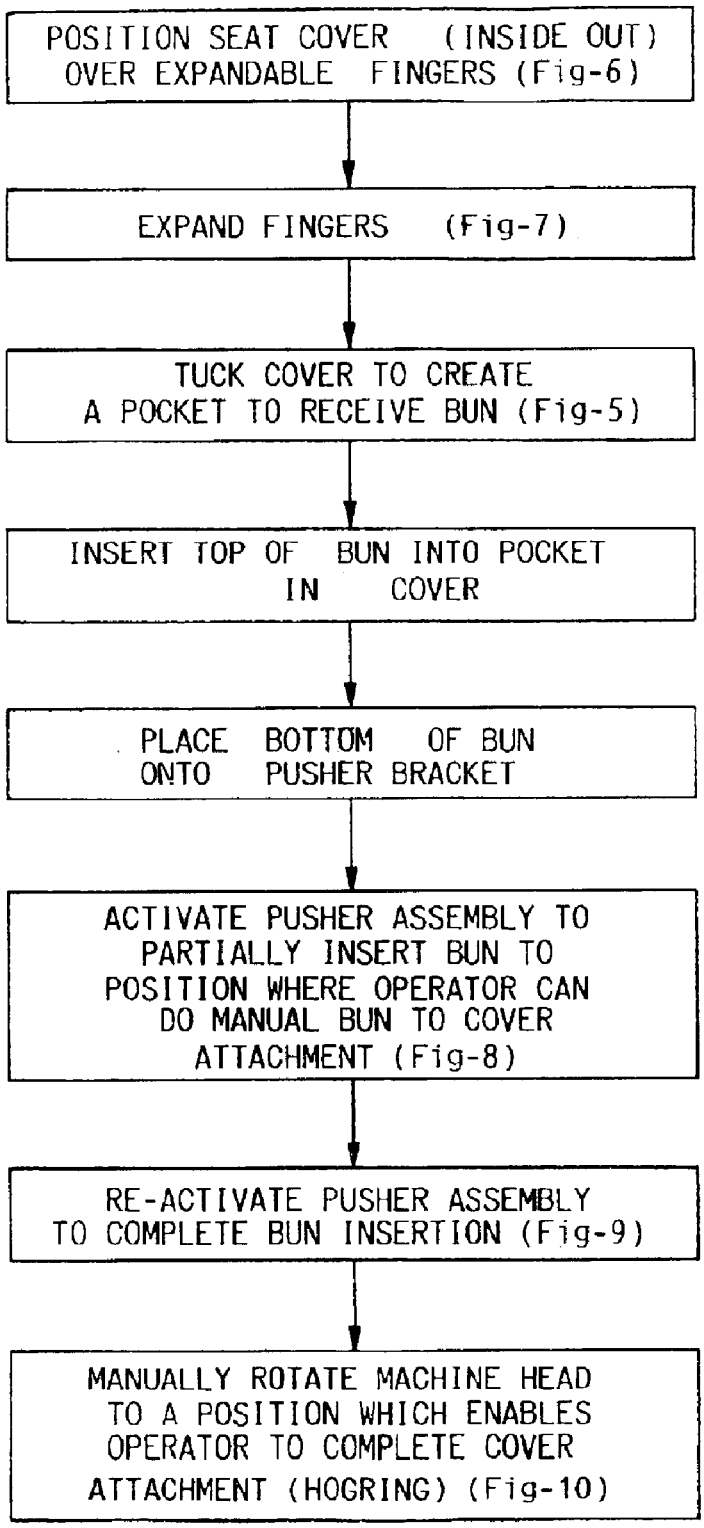
FIG. 3 is a fitting procedure flow chart.

FIG. 3 is a fitting procedure flow chart and illustrates the individual steps taken throughout the procedure. It is understood that some of the steps may be modified. For example, step 6 allows the operator to "do manual bun cover attachment." This procedure typically involves the operator attaching a hog ring between a seat cover and an insert to contour the seat cover in relation to the shape of the insert. The final step, step 8, allows the "operator to complete cover attachment (hog ring)." In addition to possible hog ring attachment, the step of completing cover attachment may include fitting and closing a hook-and-loop fastener, a conventional zipper, or a "J-channel."

As illustrated, the apparatus 10 is provided on a bench with a single stuffing bracket 38. This set-up could be varied in use as required. For example, a number of stuffing brackets may be used in conjunction with a single holding assembly 18. Instead of the stuffing bracket 38 returning to its home position, it could drive the insert into the cover and keep pushing the insert through the holding assembly 18 for delivery to a point further down the conveyor system. The next cover would be stuffed by the next stuffing bracket and so on, with the stuffing brackets each eventually returning by a closed-loop belt to proceed with the next fitting operation.

Figure 4:
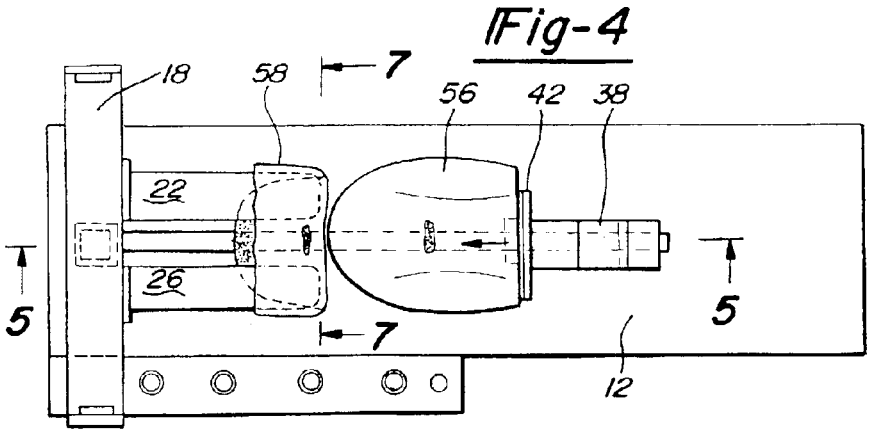
FIG. 4 is a top plan view of the preferred embodiment of the present invention.

FIG. 4 is atop plan view ofthe apparatus 10 with a cover 58 in place as well as an insert 56 in place between the plate 42 of the stuffing bracket 38 and the top end 66 ofthe cover 58. The blades 22, 24, 26, 28, 23, 25 (of which only blades 22, 26 are visible in this view) are in a position opposing the stuffing bracket 38, and this represents their cycling position. This view illustrates the first three steps of the procedure flow chart as completed. The inside-out cover has been fitted over the blades, the blades are expanded along the x- and y-axes to their outermost positions, and the top end of the cover 58 has been tucked in slightly to form a pocket and thereby accommodate the placement therein of the top end 60 of the insert 56.

Figure 5:
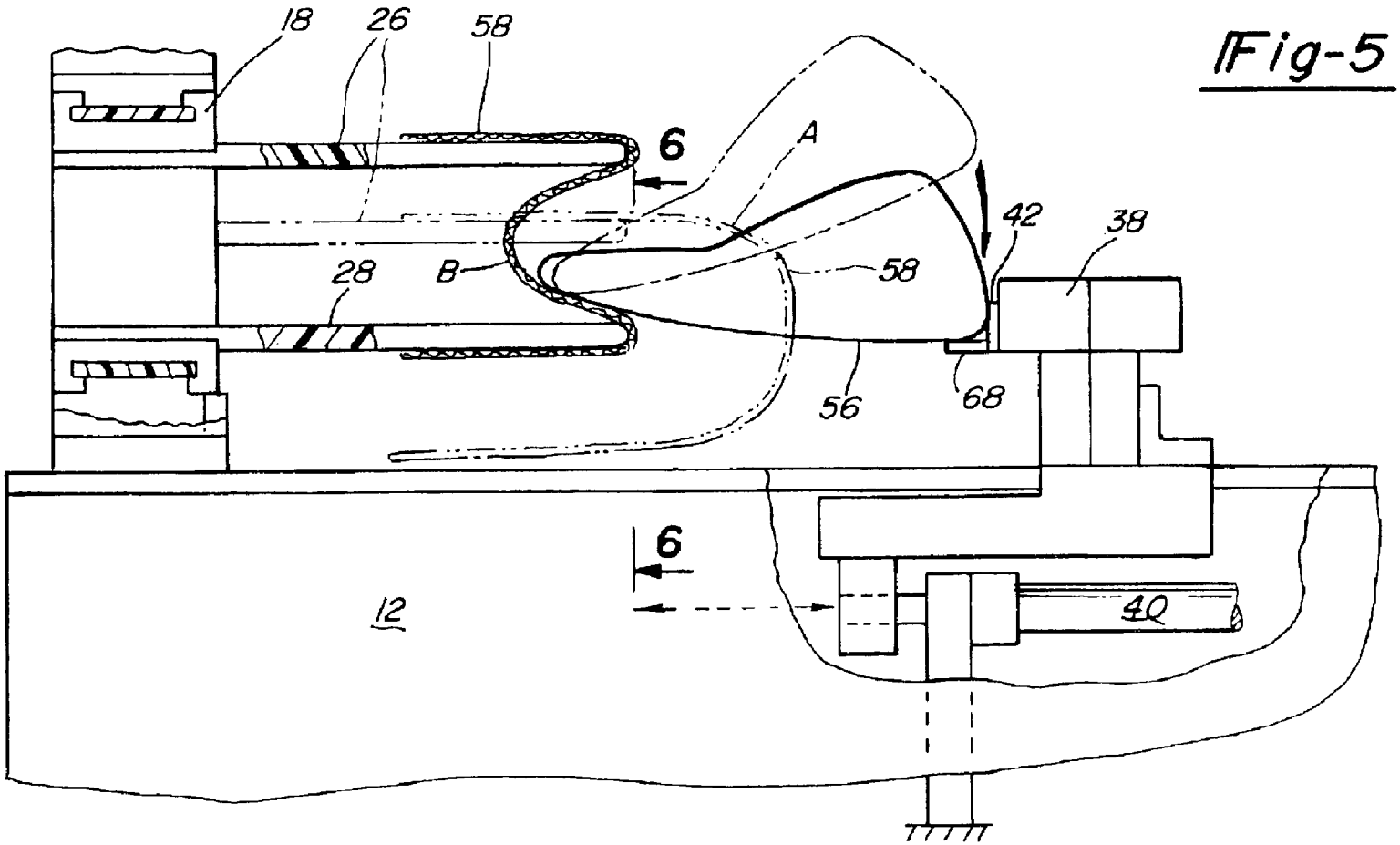
FIG. 5 is a side elevational view of the preferred embodiment of the present invention taken along line 5—5 of FIG. 4.

FIG. 5 illustrates a side elevational view of the apparatus 10 taken along line 5—5 of FIG. 4. The cover 58 is illustrated in both solid and broken lines. The broken lines illustrate the general appearance of the cover 58 after it is turned inside-out and is placed on the blades. At this stage, the blades are grouped together in their "rest" positions. This is illustrated by the broken lines of the cover 58 at position "A." The operator then operates the apparatus 10 so as to expand the blades to the maximum positions into the corners of the cover 58.

At this stage, the top end 66 of the cover 58 bulges away from the tips of the blades. To allow for placement of the top end 60 of the insert 56 into the cover 58, the top end 66 of the cover 58 is tucked to create a pocket as illustrated by the solid lines of the cover 58. The operator then places the bottom end 62 of the insert 56 upon a supporting ledge 68 attached to the plate 42 of the stuffing bracket 38 and moves the bracket 38 in the direction of the holding assembly 18 until the top end 60 of the insert 56 is fitted into the pocket created in the cover 58. The apparatus 10 and its associated cover 58 and insert 56 are now ready to begin the fitting cycles where the bracket 38 continues to push the insert 56 into the inside-out cover 56 with the cover 58 gradually turning outside-out to envelop the insert 56.

Figure 6:
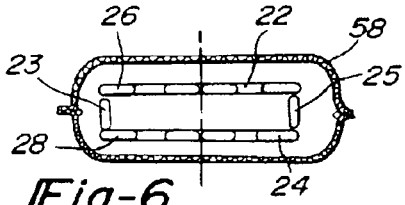
FIG. 6 is a view taken along line 6—6 of FIG. 5 and illustrating the blades grouped together.

FIG. 6 is a view taken along line 6—6 of FIG. 5 and illustrates the blades 22, 24, 26, 28 in their grouped together or "rest" positions. The cover 58 is inside-out and is loosely fitted around the blades.

Figure 7:
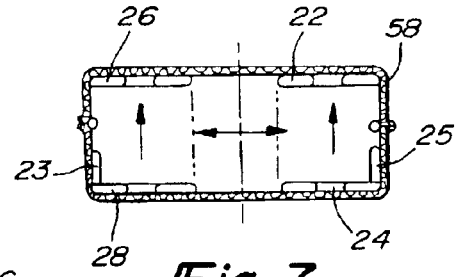
FIG. 7 is a view taken along line 7—7 of FIG. 4 and illustrating the blades in their expanded positions.

FIG. 7 is a view taken along line 7—7 of FIG. 4 and illustrates the blades 22, 24, 26, 28 in their expanded positions and fitted within the comers of the cover 58. This placement of the blades opens up the cover 58 to accommodate the insert 56 according to subsequent fitting steps. Because the blades 22, 24, 26, 28 are self-adjusting, the apparatus 10 can accommodate a wide variety of covers having different sizes. As mentioned above with respect to FIG. 1, the blades 22, 24, 26, 28 may also be adjusted for length to accommodate either shallow or deep covers. This versatility makes the apparatus 10 desirable not only for use in fitting seat covers, but also in fitting covers to head and arm rests as well.

Figure 8:
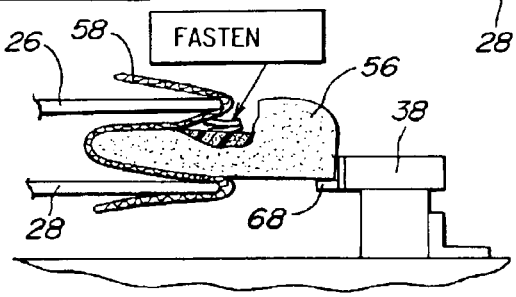
FIG. 8 is a side view illustrating in detail the stuffing bracket holding the insert and the relation of the insert to the blades and cover.

FIG. 8 is a partial side view of the apparatus 10 illustrating in detail the relationship between the insert 56 as it is partially inserted into the cover 58, the stuffing bracket 38, and the blades 26, 28. This particular view illustrates the cover 58 being attached to the insert 56 by a fastener. The attaching procedure may be accomplished as necessary at any discrete position during the stuffing cycle by programming or by manual operation as described above.

Figure 9:
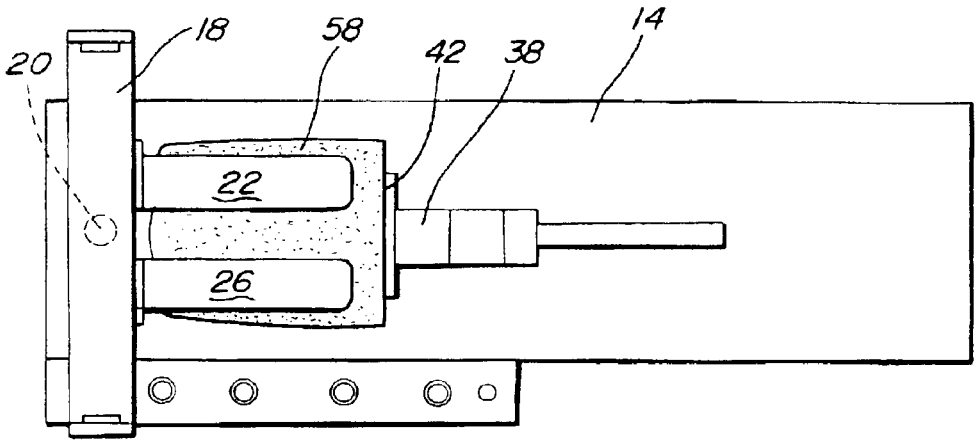
FIG. 9 is a top plan view similar to FIG. 4 but illustrating the insert fitted within the cover.

FIG. 9 is a top plan view of the apparatus 10 similar to the view of FIG. 4 but illustrating the insert 56 fully fitted within and hidden by the outside-cover 58. The blades 22, 26 (and 24, 28, although not visible) securely hold the assembled cover and insert between them. The stuffing bracket 38 has moved to its maximum position toward the holding assembly 18, and the stuffing cycle is complete.

Figure 10:
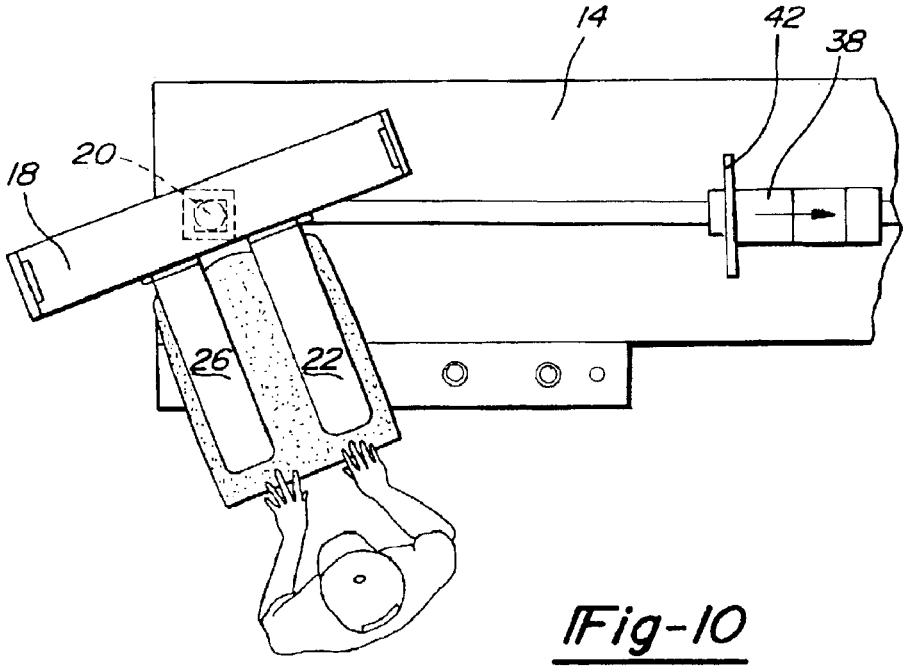
FIG. 10 is a view similar to that of FIG. 9 but illustrating the holding assembly pivoted to its operator-accessible position.

FIG. 10 is a view similar to that of FIG. 9 but illustrating the holding assembly 18 pivoted on the pivoting arm 20 to its operator-accessible position. As illustrated, the stuffing bracket 38 has been withdrawn to its "rest" position at its maximum distance from the holding assembly 18. While the blades 22, 24, 26, 28 retain a slight grip on the assembled cover and insert, the operator is able nevertheless to withdraw the assembly from the blades.

After the assembly is withdrawn (not shown), the operation is completed, and the blades 22, 24, 26, 28 are ready to be returned to the "rest" positions to begin another fitting cycle.

Figure 11:
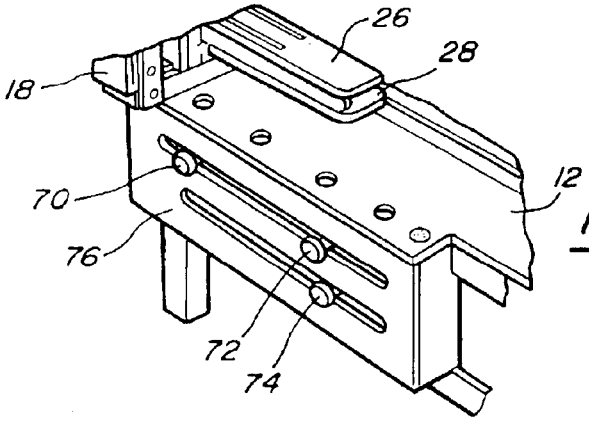
FIG. 11 is a partial view of the fitting apparatus of the present invention showing an alternate embodiment of the control panel.

FIG. 11 is a partial view of an alternate embodiment of the control panel of the apparatus 10. This embodiment includes a series of manual control knobs 70, 72, 74 situated on a manual control board 76. The control knobs 70, 72, 74 allow for the operator to adjust the stops of the apparatus 10 manually prior to commencement of the fitting cycle. This method of operation allows the operator to control the restart after each stop. While perhaps not having the convenience or accuracy of programming, this embodiment does offer the operator the advantage of being able to visualize the positioning of the stops more directly than the computerized method.

Figure 12:
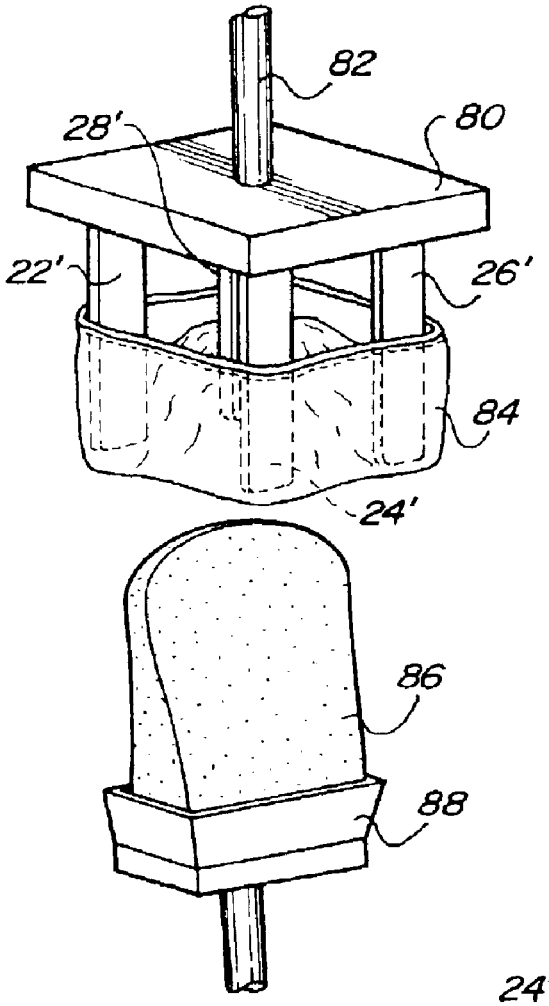
FIG. 12 is a perspective view of an alternate embodiment of the present invention illustrating the blades with a seat cover disposed thereover in a fitting assembly without a table.
Figure 13:
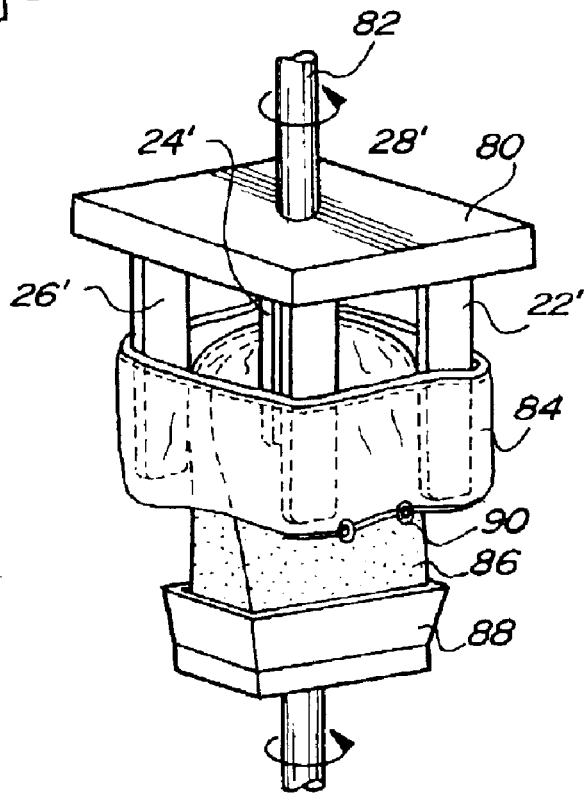
FIG. 13 is a perspective view similar to that shown in FIG. 12 wherein the blades have surrounded a seat bun.

FIGS. 12 and 13 illustrate an alternate embodiment of the invention in which a set of blades 22', 24', 26', 28' are fitted to a holding assembly 80. Unlike the previously-discussed holding assembly 18, the holding assembly is unsupported by a table or bench. Rather, the holding assembly 80 is independently supported by a beam or a bar, such as a bar 82 shown in FIGS. 12 and 13.

With reference to FIG. 12, a seat cover 84 is fitted inside-out over the blades 22', 24', 26', 28' and the blades are moved outwardly along their x- and y-axes until the cover 84 is held more or less tautly. A bun 86 is provided on a bun holder 88. The assembly 80 and the holder 88 are moved closer toward one another (one or the other moves, or both) until the bun 86 is inserted into the inside-out cover 84.

The assembly 80 and the holder 88 may continue to move towards one another in a continuous manner until the cover 84 is completely turned outside-out, or the procedure may be interrupted some ways through, as illustrated in FIG. 13. With respect thereto, the procedure may be automatically halted or the operator may selectively halt it to perform such operation as attachment of a hog ring 90. Once the ring 90 is attached, the procedure continues until, again, the cover 84 is completely turned outside-out.

Figure 14:
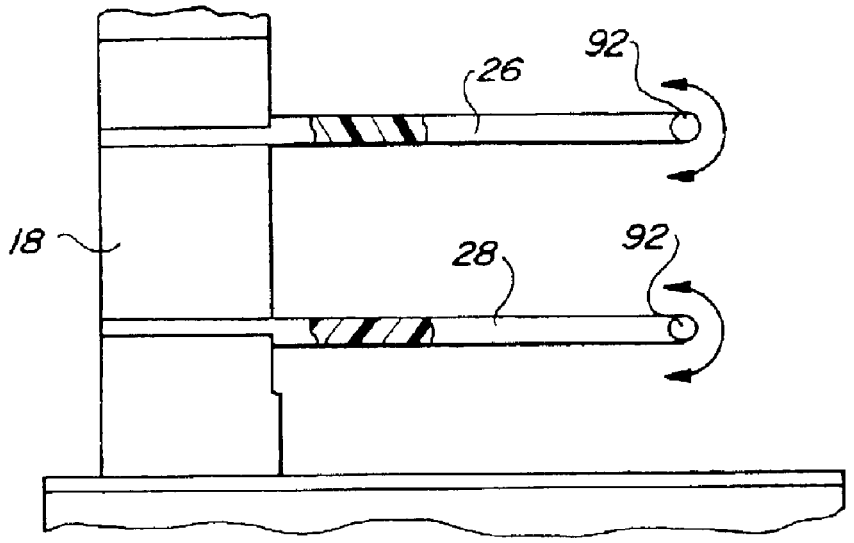
FIG. 14 is an elevational side view showing an alternate embodiment of the blades with roller balls fitted thereto.
Figure 15:
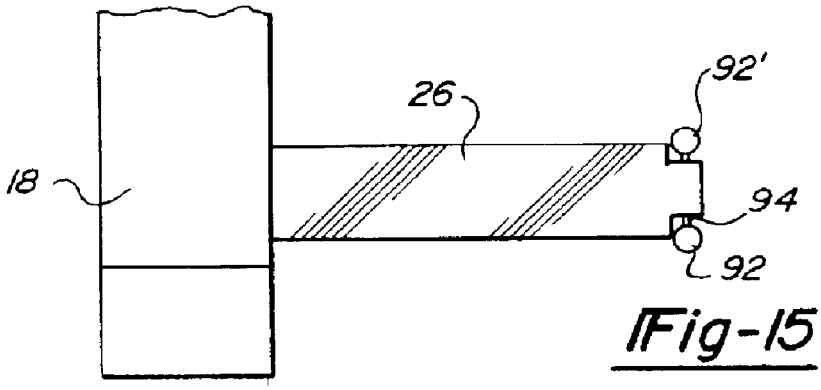
FIG. 15 is a top plan view of a single blade of the embodiment of FIG. 14.
Figure 16:
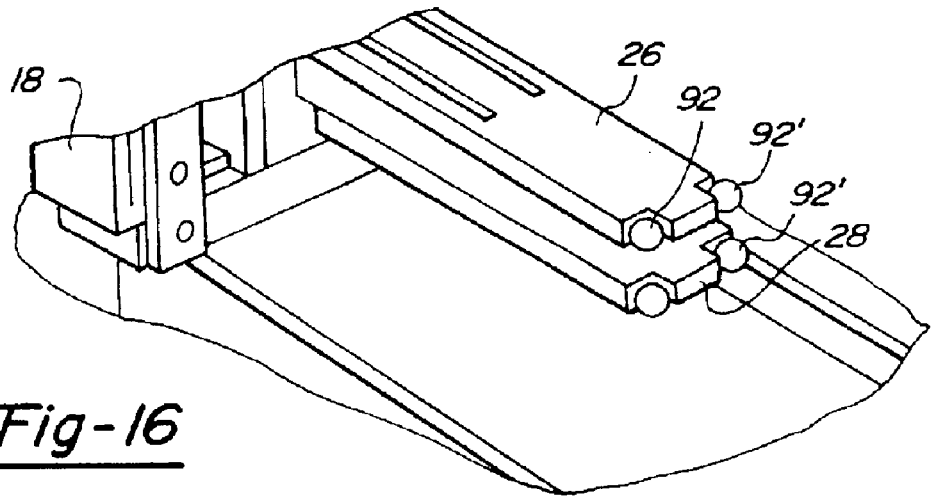
FIG. 16 is a perspective view of a pair of blades, one atop the other, and having fitted thereon roller balls of the alternate embodiment.

Referring to FIGS. 14 through 16, an alternate embodiment of the blades is illustrated. With respect to FIG. 14, a set of roller balls 92,92' is provided on the tip of each of the blades 22, 24, 26, 28 (blades 22, 24 are not shown in this view). The roller balls 92,92' are provided to allow for freer movement of a cover across the tips of the blades, thus reducing strain on the material and the possibility of damage to the cover.

FIG. 15 is a top plan view of the blade 26 with the roller balls 92, 92' attached. The roller balls 92, 92' are fitted to a central axle 94 that is rotatably provided through the end of the blades. As illustrated, the roller ball 92 is preferably disposed flush to the outer edge of the blade 26, while the inner ball 92' need not be flush. This arrangement serves to allow convenient passing of the material against the outer side of the blade without causing any strain to the material. Conversely, the material only rolls about the "equator" of the inner balls 92' without passing on the "fixed" pole, hence the balls 92 need not be flush with the inner edge of the blade 26.

FIG. 16 illustrates a perspective view of the roller balls 92, 92'.

Having described our invention, however, many modifications thereto will become apparent to those skilled in the art to which it pertains without deviation from the spirit of the invention as defined by the scope of the appended claims.

We claim:

1. An apparatus for fitting a covering material over a supporting insert, said apparatus comprising:

a stuffing bracket for stuffing the supporting insert into the covering material;

a material holding assembly comprising a plurality of blades upon which said covering material is placed;

power means for moving said blades back and forth along an axis so as to adjust a distance between said blades;

said stuffing bracket and said material holding assembly being movable with respect to each other from a spaced apart position to an insert position where said covering material is fitted over said supporting insert;

a driver system for selectively moving said stuffing bracket and said holding assembly between said spaced apart position and said insert position.

2. The apparatus of claim 1, wherein each of said blades includes a tip, said tip further including at least one rolling body rotatably attached to said tip, said covering material being passable along said at least one rolling body.

3. The apparatus of claim 1, wherein said blades have a low friction surface.

4. The apparatus of claim 3, wherein said material is a polymerized material.

5. The apparatus of claim 4, wherein said polymerized material is polymerized.

6. The apparatus of claim 3, wherein said material is a metal.

7. The apparatus of claim 6, wherein said metal is aluminum.

8. The apparatus of claim 1, wherein said power means for moving said blades comprises a driver for moving said blades to expand said covering material positioned therein.

9. The apparatus of claim 8, wherein each said driver includes means for limiting the movement of said blade associated therewith whereby the movement of said blade is limited to the maximum size to which said covering material may be expanded.

10. The apparatus of claim 9, wherein said driver is a pneumatic driver.

11. The apparatus of claim 10, wherein said power means for moving further comprises an electronic control system.

12. The apparatus of claim 1 and including a programmer operable with said driver system for selectively positioning said stuffing bracket and its associated insert and said material holding assembly at selected positions between said spaced apart position and said insert position.

13. The apparatus of claim 12, including a pre-set timer that provides for al pre-set increment of stop time before the relative motion of the stuffing bracket and said material holding assembly restarts.

14. The apparatus of claim 1, wherein said driver system includes a manually-operable control knob and a control board, said control knob being movable upon said control board to select relative positions for said stuffing bracket and said material holding assembly.

15. The apparatus of claim 1, wherein said stuffing bracket further includes a ledge upon which an end of said insert may be rested.

16. The apparatus as defined in claim 1 and in which said driver system is operative to move said stuffing bracket toward said holding assembly.

17. The apparatus as defined in claim 1 and in which said plurality of blades includes at least two blades spaced from each other and said power means selectively moves said two blades away from each other.

18. An apparatus for fitting a covering material over a supporting insert, said apparatus comprising:

a stuffing bracket for stuffing the supporting insert into the covering material;

a material holding assembly comprising a plurality of blades upon which said covering material is placed;

a first power means for moving said blades back and forth along a first axis so as to adjust a distance between said blades;

a second power means for moving said blades back and forth along a second axis perpendicular to said first axis;

said stuffing bracket and said material holding assembly being movable with respect to each other from a spaced apart position to an insert position where said covering material is fitted over said supporting insert;

a driver system for selectively moving said stuffing bracket and said holding assembly between said spaced apart position and said insert position.

19. The apparatus of claim 18, wherein each of said blades includes a tip, said tip further including at least one rolling body rotatably attached to said tip, said covering material being passable along said at least one rolling body.

20. The apparatus of claim 18, wherein said first power means for moving said blades comprises a driver for moving said blades to expand said covering material positioned thereon.

21. The apparatus of claim 20, wherein each said driver includes means for limiting the movement of said blade associated therewith whereby the movement of said blade is limited to a maximum size to which said covering material may be expanded.

* * * * *